US010880765B2

(12) United States Patent
Arena et al.

(10) Patent No.: US 10,880,765 B2
(45) Date of Patent: Dec. 29, 2020

(54) PERFORMANCE MONITORING OF A MOBILE COMMUNICATION SYSTEM

(71) Applicant: Telecom Italia S.p.A., Milan (IT)

(72) Inventors: Domenico Arena, Milan (IT); Luca Castaldelli, Turin (IT); Mauro Cociglio, Turin (IT); Giuseppe Fioccola, Turin (IT); Davide Missan, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 15/539,304

(22) PCT Filed: Dec. 29, 2014

(86) PCT No.: PCT/EP2014/079358
§ 371 (c)(1),
(2) Date: Jun. 23, 2017

(87) PCT Pub. No.: WO2016/107629
PCT Pub. Date: Jul. 7, 2016

(65) Prior Publication Data
US 2018/0014214 A1    Jan. 11, 2018

(51) Int. Cl.
*H04W 24/08* (2009.01)
*H04L 12/26* (2006.01)
*H04L 12/741* (2013.01)

(52) U.S. Cl.
CPC ............ *H04W 24/08* (2013.01); *H04L 43/00* (2013.01); *H04L 43/04* (2013.01);
(Continued)

(58) Field of Classification Search
CPC ... H04L 41/145; H04L 43/0852; H04L 43/10; H04L 43/106; H04L 43/0829;
(Continued)

(56) References Cited

U.S. PATENT DOCUMENTS

| 2003/0123401 A1* | 7/2003 | Dean ................. H04B 7/15535 370/318 |
| 2012/0064838 A1* | 3/2012 | Miao ..................... H01Q 3/267 455/73 |

(Continued)

FOREIGN PATENT DOCUMENTS

| EP | 2081324 A1 | 7/2009 |
| WO | 2010/072251 A1 | 7/2010 |
| WO | 2011/079857 A1 | 7/2011 |

OTHER PUBLICATIONS

Jul. 3, 2015—(WO) Int'l Search Report & Written Opinion—App PCT/EP2014/079358.

*Primary Examiner* — Harun Chowdhury
(74) *Attorney, Agent, or Firm* — Banner & Witcoff, Ltd.

(57) ABSTRACT

An apparatus is provided for measuring the performance of a mobile communication system. The apparatus includes two measurement mobile interfaces and a measurement probe. The probe is connected to the backhauling interface of a base station of the system. Then, one measurement mobile interface transmits packets to the other measurement mobile interface via the base station. These packets are received at the base station, forwarded to the packet gateway of the system, sent back to the same base station, and finally received at the destination measurement mobile interface. Since the measurement probe belongs to the same apparatus as the mobile interfaces, it may detect the packets as transmitted/received at the backhauling interface. The probe then generates performance parameters relating to the packets as transmitted/received by the mobile interfaces and/or as detected at the backhauling interface. The system performance is then measured based on such parameters.

22 Claims, 6 Drawing Sheets

(52) U.S. Cl.
CPC .......... *H04L 43/0864* (2013.01); *H04L 43/12* (2013.01); *H04L 45/74* (2013.01)

(58) Field of Classification Search
CPC ..... H04L 43/00; H04L 43/04; H04L 43/0864; H04L 43/12; H04W 24/06; H04W 24/08; H04W 28/02; H04W 28/0268; H04W 88/08
USPC ................ 370/235, 249, 252, 328, 329, 248
See application file for complete search history.

(56) References Cited

U.S. PATENT DOCUMENTS

| | | | |
|---|---|---|---|
| 2013/0083671 A1* | 4/2013 | Eskicioglu | H04W 24/06 370/249 |
| 2013/0307635 A1* | 11/2013 | Kase | H03F 3/195 333/112 |
| 2014/0092736 A1* | 4/2014 | Baillargeon | H04W 72/1226 370/230 |
| 2014/0211638 A1* | 7/2014 | Huang | H04W 24/06 370/249 |
| 2014/0289527 A1* | 9/2014 | Fukuda | H04L 63/0428 713/171 |
| 2014/0293804 A1 | 10/2014 | Kakadia et al. | |
| 2015/0181644 A1* | 6/2015 | Ehrentraut | H04B 1/005 455/553.1 |
| 2016/0006634 A1* | 1/2016 | Li | H04L 43/0829 370/252 |

\* cited by examiner

PERFORMANCE MONITORING OF A MOBILE COMMUNICATION SYSTEM

TECHNICAL FIELD

The present invention generally relates to the field of mobile communication systems. In particular, the present invention relates to an apparatus and method for monitoring the performance of a mobile communication system, for instance (but not exclusively) an LTE (Long Term Evolution) communication system.

BACKGROUND ART

As it is known, a mobile communication system allows a plurality of users provided with respective user terminals (e.g. mobile phones, smart phones, tablets, laptop PCs, etc.) spread over a wide geographical area to access telephone services and data services via wireless connection. Exemplary mobile communication systems are GSM (Global System for Mobile communications), UMTS (Universal Mobile Telecommunications System), HSDPA (High-Speed Downlink Packet Access) and LTE (Long Term Evolution).

By referring in particular to LTE, such mobile communication system typically comprises a radio access network (also termed E-UTRAN, namely Evolved UMTS Terrestrial Radio Access Network), a backhauling network and a core network (also termed EPC, namely Evolved Packet Core). The radio access network comprises several base stations (also termed eNodeB) spread over a certain geographical area. Each eNodeB typically provides coverage to one or more cells, each cell being an area nearby the eNodeB. The eNodeB in particular exchanges traffic with user terminals located within its cell(s). Several eNodeBs are typically connected to a packet gateway (also termed PGW, namely Packet Data Network Gateway) via the backhauling network. The packet gateway provides access to the core network. The core network is an IP network, which provides a routing function allowing to route traffic amongst the various user terminals.

An eNodeB typically comprises a Baseband Unit (briefly, BBU) responsible of performing baseband processing of traffic pertaining to the cell(s) covered by the eNodeB. Further, an eNodeB typically comprises a Remote Radio Unit (briefly, RRU) for each covered cell, which is responsible of performing conversion between baseband domain and radio frequency domain of the traffic pertaining to its cell. An eNodeB also typically comprises an antenna system, in turn comprising one or more antennas responsible of exchanging traffic in the form of radio frequency signals with the terminals located in the cell(s) covered by the eNodeB. The number of antennas depends on the number of covered cells, the number of radio carriers and the MIMO (Multiple Input Multiple Output) capabilities of the mobile communication system.

While the BBU (optionally, with the RRU(s) embedded therein) is typically placed in a protected indoor location, the antenna system is typically located outdoor. The RRU(s) are typically connected to the antenna system by means of coaxial cables.

Typically, an eNodeB (in particular, its BBU) is provided with a backhauling interface (e.g. an optical Gigabit Ethernet interface) for its connection to the core network via the backhauling network. The optical Ethernet interface of the BBU is typically connected to the backhauling network via a pair of optical fibers (one per each traffic direction).

Systems are known for measuring the performance of a mobile communication system, e.g. in terms of delay, jitter or traffic throughput.

Such systems are typically based on a client-server approach, whereby a measurement client (typically a mobile phone or a PC or tablet with mobile connectivity, provided with a suitable client software) communicates with a measurement server implemented within the core network. The measurement client generates a flow of artificial packets and transmits them to the measurement server via an eNodeB, the backhauling network, the packet gateway and the core network. The measurement server then retransmits the packets to the client, which may then calculate performance parameters indicative of the performance of the end-to-end connection between client and server.

WO 2010/072251, the name of the same Applicant, discloses a packet loss measurement which provides for marking the packets of a packet flow to be measured so as to divide the packet flow in alternating blocks. Counters are generated for each block as transmitted and as received, which allow calculating the packet loss of the packet flow.

Moreover, WO 2011/079857, in the name of the same Applicant, discloses a performance measurement which provides for marking the packets of a packet flow to be measured so as to divide the packet flow in alternating blocks, and for generating timestamps for such marked packets both at the transmitting side and at the receiving side.

SUMMARY OF THE INVENTION

The inventors have noticed that the above known client-server systems for measuring the performance of a mobile communication network have some drawbacks.

First of all, the measurement server is typically a centralized entity, which supports measurement sessions with several measurement clients. Hence, its performance (e.g. its response time) depends on the number of simultaneously opened measurement sessions.

Moreover, only end-to-end measurements between client and server are possible, since only the measurement client and the measurement server are capable of recognizing the packets to be measured. The path followed by the packets from client to server however comprises several sections, namely a radio access section (between measurement client and eNodeB), a backhauling section (between the backhauling interface of the eNodeB and the packet gateway) and a core section (between the packet gateway and the measurement server). Hence, in case the performance measurement results are unsatisfactory, it is not possible to determine which section is responsible.

In principle, this latter drawback is relieved for the performance measurement technique disclosed e.g. by the above mentioned WO 2010/072251 and WO 2011/079857. Thanks to the marking, the packets to be measured may be recognized at any intermediate point of their transmission path. Hence, suitable probes (e.g. suitably programmed PCs or Linux machines) capable of recognizing the marked packets and generating the relevant timestamps may be placed at any intermediate position of the path. Measurement parameters may therefore be provided for each section of the path. For instance, a probe could be arranged immediately upstream the eNodeB. This would allow providing separate performance measurements for the radio access section only. Other probes could provide separate measurements for the other sections of the path, e.g. a further probe at the packet gateway would allow providing separate performance measurements for the backhauling section only.

The inventors have however noticed that the client-server implementation of the performance measurement of WO 2010/072251 and WO 2011/079857 provides accurate results only for round-trip measurements, unless all the involved machines (namely, the measurement server, the measurement client and the probe(s)) are reciprocally synchronized (namely, they generate consistent timestamps). Hence, possible asymmetries of the performance in the upstream direction and downstream direction (which would be recognizable only if two-way measurements were possible) can not be measured.

In any case, the inventors have noticed that it would be desirable providing separate performance measurements relating to radio access section and backhauling section also for measurements other than the one of WO 2010/072251 and WO 2011/079857, in particular for any known performance measurement including those which do not require marking the packets to be measured, e.g. those based on the known Ping mechanism.

In view of the above, the inventors have tackled the problem of providing an apparatus and method for measuring the performance of a mobile communication system (in particular, but not exclusively, an LTE mobile communication system) which solves at least one of the above drawbacks.

In particular, the inventors have tackled the problem of providing an apparatus and method for measuring the performance of a mobile communication system, which is capable of providing accurate and reliable two-way measurements at least for the radio access portion, without requiring any synchronization of different apparatuses and without requiring any marking of the packets, and whose measurement performance is independent of the number of measurement sessions simultaneously opened in the mobile communication system.

According to the present invention, the above problem is solved by a performance measurement apparatus comprising two measurement mobile interfaces and a measurement probe. The measurement mobile interfaces exchange with each other measurement packets via a same base station (since they are comprised in the same apparatus, they are co-located). In particular, one measurement mobile interface generates packets addressed to the other measurement mobile interface and sends them to the base station covering the area in which the apparatus is located, which encapsulates and forwards them to the packet gateway. The packet gateway sends the packets back to the same base station, which finally forwards them to the other measurement mobile interface.

In the present description and in the claims, the expression "packet gateway" will designate the first apparatus located upstream the base station which is provided with routing functionalities and which is capable of extracting the packets originated by the first measurement mobile interface from the encapsulated packets received from the base station, reading their destination address and, based on the packet's destination address, decide to encapsulate them and send them back to the base station. The expression "packet gateway" within the meaning of the present invention may then designate indifferently:

either the core network's apparatus with the previous features to which the base station is connected via the backhauling network;

or an apparatus (e.g. a server) specifically provided with the previous features and expressly arranged for measurement purposes e.g. at an intermediate position along the path followed by the encapsulated packets through the backhauling network.

Since the packets basically travel back and forth between apparatus and packet gateway, the path they follow comprises two radio access sections (from the transmitting measurement mobile interface to the base station and from the base station to the receiving measurement mobile interface) and two backhauling sections (from the base station to the packet gateway and from the packet gateway to the base station).

Furthermore, according to the invention the measurement probe of the apparatus is connected to the backhauling interface of the base station (namely, the interface through which the base station is connected to the backhauling network). Since the measurement probe is comprised in the same apparatus which generated the packets, it can recognize such packets as they are transmitted from and/or received at the backhauling interface of the base station, even if they are not marked.

Hence, the measurement probe may generate both performance parameters (e.g. timestamps) relating to the packets as transmitted and/or received by the measurement mobile interfaces, and performance parameters (e.g. timestamps) relating to the packets as detected at the backhauling interface of the base station. While the first parameters alone provide end-to-end measurements of the connection between the two measurement mobile interfaces, the combination of the first and second parameters advantageously provides separate two-way measurements relating to the radio access sections of the transmission path and round-trip measurements of the backhauling sections of the transmission path.

As mentioned above, the measurement probe of the apparatus is capable of recognizing the packets to be measured even though they do not comprise any marking. Hence, the above method may be advantageously applied to any known performance measurement type, including those that are not based on packet marking (e.g. those based on the Ping mechanism).

Moreover, no synchronization of different apparatuses is required, since all the parameters allowing performance measurements (e.g. transmission timestamps, reception timestamps, etc.) are generated by a unique apparatus.

Furthermore, since the apparatus is autonomously capable of carrying out the whole measurement session without involving any centralized entity, the measurement performance is independent of the number of measurement sessions simultaneously opened in the mobile communication system.

Using a single apparatus has further advantages, e.g. reducing the amount of hardware needed for performance monitoring purposes and then, ultimately, reducing the costs for performance monitoring.

According to a particularly preferred embodiment of the invention, in order to transmit and receive the packets, instead of communicating with the antenna of the base station via radio, both the measurement mobile interfaces are connected via respective wired connections to the wired connection (typically comprising coaxial cables, as discussed above) between the RRU and the antenna system of the base station. Hence, in the upstream direction the packets transmitted by the first measurement mobile interface bypass the antenna system and are directly received at the RRU. Moreover, in the downstream direction, the packets emitted by the RRU also bypass the antenna system, and are directly received by the second measurement mobile interface.

As it will be discussed in detail herein after, this variant exhibits several advantages over other alternatives, in particular simpler installation issues and more accurate and repeatable results.

According to a first aspect, the present invention provides an apparatus for measuring a performance of a mobile communication system comprising a base station, a packet gateway and a backhauling network connecting the base station and the packet gateway, the apparatus (2) comprising;

- a first measurement mobile interface and a second measurement mobile interface, the first measurement mobile interface being configured to transmit packets addressed to the second measurement mobile interface via the base station so that the packets are transmitted from the base station to the packet gateway and from the packet gateway to the base station, and the second measurement mobile interface being configured to receive the packets from the base station; and
- a measurement probe suitable for being connected to a backhauling interface of the base station and for detecting the packets as transmitted from the base station to the packet gateway or as received at the base station from the packet gateway, the measurement probe being further configured to generate at least one first performance parameter relating to the packets as transmitted from the first measurement mobile interface or the packets as received at the second measurement mobile interface, generate at least one second performance parameter relating to the packets as detected by the measurement probe, and use the at least one first performance parameter or the at least one second performance parameter for measuring a performance of the mobile communication system.

Preferably, the measurement probe is configured to detect the packets as transmitted from the base station to the packet gateway or as received at the base station from the packet gateway by receiving a copy of traffic transmitted from the base station to the packet gateway or received at the base station from the packet gateway and filtering the copy of the traffic based on a value of a field of the packets which uniquely identifies the packets.

According to first variants, the field whose value uniquely identifies the packets is a source address field or a destination address field of the packets.

According to other variants, the first measurement mobile interface (21) is configured to mark said packets (Pk) before transmitting them. Marking may comprise either setting a marking field of each packet to a predefined value distinguishing the packets from other packets received in an upstream direction at the base station, or setting the marking field of each packet to one of two predefined values so as to divide the into a sequence of blocks of packets with alternating marking values. According to such variants, the field whose value uniquely identifies the packets is the marking field of the packets.

According to some embodiments, the measurement probe is configured to decrypt the packets before filtering them. This requires that the measurement probe posses the encryption/decryption keys.

Alternatively, the measurement probe is configured to filter the copy of the traffic before it is encrypted by the base station and transmitted to the packet gateway, or after it is received at the base station from the packet gateway and decrypted by the base station.

Alternatively, the value of the field uniquely identifying the packets (Pk) is mapped or copied in a further field of further packets in which the packets are encapsulated before transmission from the base station to the packet gateway or from which the packets are de-encapsulated after reception at the base station from the packet gateway. In such case, the measurement probe is configured to filter the copy of traffic based on the value of the further field of the further packets in which the value of the field of the original packets is mapped.

Preferably, the measurement probe is configured to perform at least one of:

- end-to-end performance measurements between the first measurement mobile interface and the second measurement mobile interface based on the at least one first performance parameter;
- two-way performance measurements from the first measurement mobile interface to the backhauling of the base station and from the backhauling interface of the base station to the second measurement mobile interface based on the at least one first performance parameter and the at least one second performance parameter; and
- round-trip performance measurements between the backhauling interface of the base station and the packet gateway based on the at least one second performance parameter.

According to preferred embodiments, the apparatus also comprises:

- a first wired connection suitable for connecting the first measurement mobile interface with a wired connection between an antenna system of the base station and a radio remote unit of the base station, the first measurement mobile interface being configured to transmit the packets to the radio remote unit of the base station via the first wired connection, so that the packets bypass the antenna system; and
- a second wired connection suitable for connecting the second measurement mobile interface with the wired connection between the antenna system of the base station and the radio remote unit of the base station, the second measurement mobile interface being configured to receive the packets from the radio remote unit of the base station via the second wired connection, so that the packets bypass the antenna system.

According to preferred embodiments, at least one of the first wired connection and the second wired connection comprises a main connection suitable for connecting the first measurement mobile interface or the second measurement mobile interface to a main antenna of the antenna system and a secondary connection suitable for connecting the first measurement mobile interface or the second measurement mobile interface to a secondary antenna of the antenna system.

Preferably, the apparatus further comprises a directional coupler comprising two main ports and two coupled ports, the directional coupler being suitable for being inserted on the wired connection between the antenna system and the radio remote unit so that the two main ports are connected to the antenna system and to the radio remote unit, the first wired connection and the second wired connection being jointly connected to one of the two coupled ports of the directional coupler.

Preferably, at least one of the first wired connection and the second wired connection comprises at least one variable attenuator.

According to a particularly preferred variant, at least one of the first wired connection and the second wired connection comprises two circulators splitting the at least one of the first wired connection and the second wired connection into an upstream branch and a downstream branch, each one of the upstream branch and downstream branch comprising a respective variable attenuator.

According to a second aspect, the present invention provides an assembly comprising a base station for a mobile communication system and an apparatus for measuring a performance of the mobile communication system as set forth above.

According to a preferred variant, the apparatus is embedded within the base station.

According to a third aspect, the present invention provides a method for measuring a performance of a mobile communication system comprising a base station, a packet gateway and a backhauling network connecting the base station and the packet gateway, the method comprising;

providing an apparatus comprising a first measurement mobile interface, a second measurement mobile interface and a measurement probe, and connecting the measurement probe to a backhauling interface of the base station;

by the first measurement mobile interface, transmitting packets addressed to the second measurement mobile interface to the base station, the packets being transmitted from the base station to the packet gateway, from the packet gateway to the base station and from the base station to the second measurement mobile interface;

by the measurement probe, detecting the packets as transmitted from the base station to the packet gateway or as received at the base station from the packet gateway (12); and by means of the measurement probe, generating at least one first performance parameter relating to the packets as transmitted from the first measurement mobile interface or the packets as received at the second measurement mobile interface, generating at least one second performance parameter relating to the packets as detected by the measurement probe, and using the at least one first performance parameter or the at least one second performance parameter for measuring a performance of the mobile communication system.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
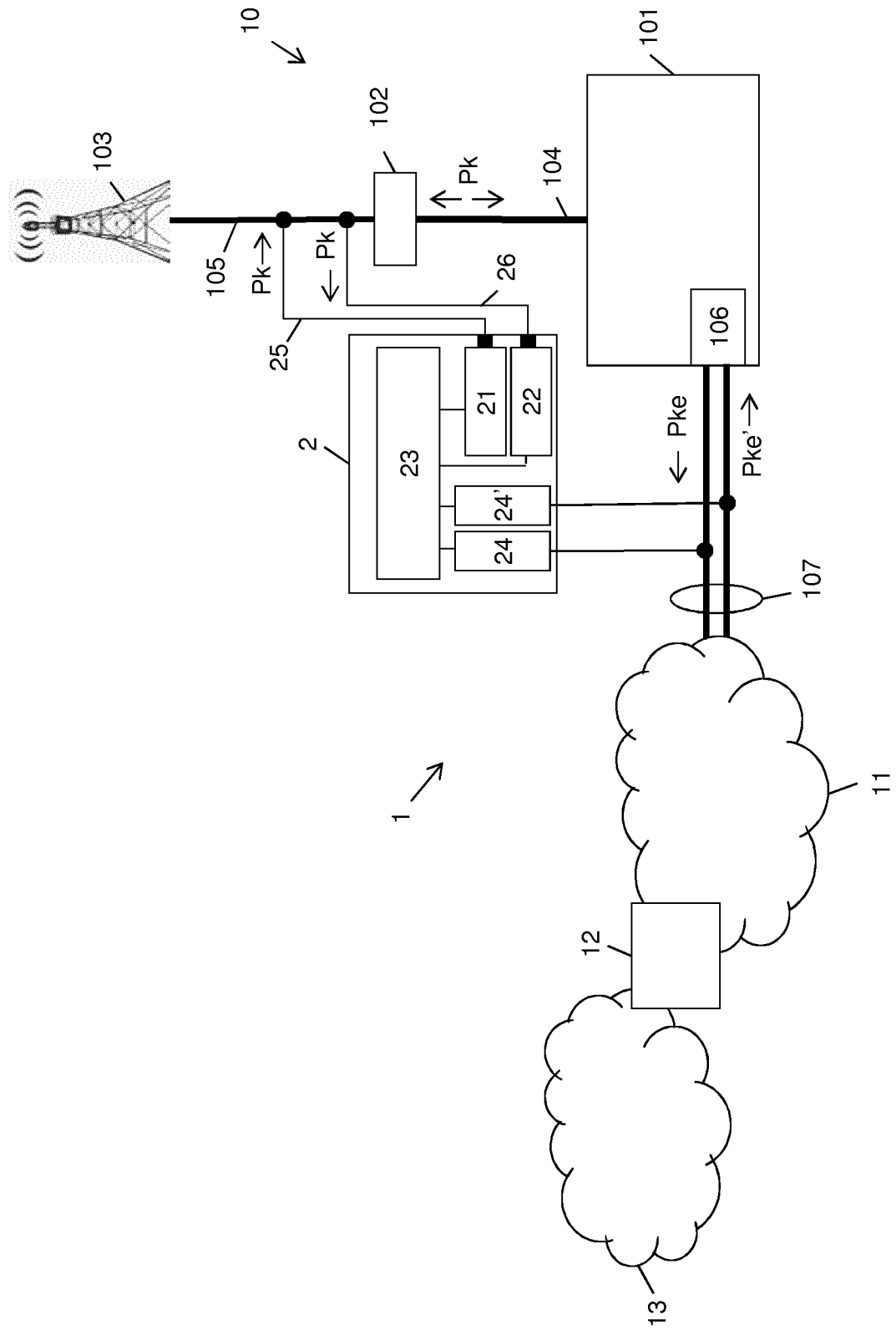
FIG. 1 schematically shows a mobile communication system and a performance measurement apparatus according to a first embodiment of the present invention.

FIG. 1 schematically shows a mobile communication system 1 and a performance measurement apparatus 2 according to an embodiment of the present invention.

The mobile communication system 1 comprises a number of base stations 10, a backhauling network 11, a packet gateway 12 and a network 13 beyond the packet gateway 12, which may comprise the core network of the mobile communication system 1 and/or an IP backbone and/or an IP network. The base stations 10 form a radio access network and are spread over a certain geographical area. In FIG. 1, for simplicity, a single base station 10 is depicted. The base stations 10 are preferably connected to the packet gateway 12 via the backhauling network 11. The packet gateway 12 in turn connects the backhauling network 11 with the network 13.

For instance, the mobile communication system 1 may be an LTE mobile communication system. In this case, the base stations 10 are eNodeBs forming a E-UTRAN, the backhauling network 11 is an IP network, the packet gateway 12 is a PGW (Packet Data Network Gateway), and the network 13 is an IP-based EPC (Evolved Packet Core).

Each base station 10 preferably comprises a baseband unit or BBU 101, an RRU 102 for each covered cell and an antenna system 103 in turn comprising a number of antennas. As discussed above, the number of RRUs 102 depends on the number of covered cells, whereas the number of antennas included in the antenna system 103 depends on the number of covered cells, the number of radio carriers and the MIMO (Multiple Input Multiple Output) capabilities of the mobile communication system 1. By way of non limiting example, in the following description it is assumed that the base station 10 shown in FIG. 1 provides coverage to a single cell, operates on a single radio carrier and is provided with MIMO 2×2 capability. The base station 10 of FIG. 1 accordingly comprises a single RRU 102 and its antenna system 103 comprises two antennas (not shown in FIG. 1).

The BBU 101 is preferably responsible of performing baseband processing of traffic, while the RRU 102 is preferably responsible of performing conversion between baseband domain and radio frequency domain. The BBU 101 is preferably placed in a protected indoor location and the antenna system 103 is preferably located outdoor. The RRU 102 may be either integrated within the BBU 101, or it may be a separate device (this latter option is the one depicted by way of non limiting example in FIG. 1). In case the BBU 101 and the RRU 102 are separate devices, they are preferably reciprocally connected by means of a wired connection 104, preferably an optical fiber. Furthermore, the RRU 102 is preferably connected to the antenna system 103 by means of a wired connection 105, preferably comprising coaxial cables.

The BBU 101 is preferably provided with a backhauling interface 106 for its connection to the backhauling network 11. In particular, the backhauling interface 106 is preferably connected to the backhauling network 11 by means of a bi-directional backhauling link 107. If the mobile communication system 1 is a LTE system, the backhauling interface 106 can be an optical Gigabit Ethernet interface, in this case the backhauling link 107 comprises a pair of optical fibers (one for the upstream direction and the other for the downstream direction).

The performance measurement apparatus 2 preferably comprises a first measurement mobile interface 21 and a second measurement mobile interface 22.

The first measurement mobile interface 21 and the second measurement mobile interface 22 may be in the form of pluggable devices removably plugged in the apparatus 2 or they may be in the form of modem units embedded in the apparatus 2. The first measurement mobile interface 21 and the second measurement mobile interface 22 are preferably connected to the base station 10 so as to exchange with it measurement packets.

To this purpose, according to some variants of the present invention not shown in the drawings, the first measurement mobile interface 21 and the second measurement mobile interface 22 are provided with respective antennas located within the cell covered by the antenna system 103. According to such variants, the measurement mobile interfaces 21 and 22 are therefore connected to the base station 10 via radio connections implemented by the antennas of the interfaces 21, 22 and the antenna system 103 of the base station 10.

According to a preferred variant (which is shown in FIG. 1), however, the first measurement mobile interface 21 and the second measurement mobile interface 22 are connected to the base station 10 via respective wired connections. In particular, according to this preferred variant, the first measurement mobile interface 21 and the second measurement mobile interface 22 are connected to the wired connection (coaxial cables) 105 between RRU 102 and antenna system 103 by means of respective wired connections 25, 26. The connections 25, 26 between the interfaces 21, 22 and the wired connection 105 comprise coaxial cable lengths and other radio frequency passive components, that will be described in detail herein after with reference to FIG. 3. This preferred variant exhibits several advantages, as it will be discussed in detail herein after.

The performance measurement apparatus 2 also comprises a measurement probe 23.

The measurement probe 23 of the apparatus 2 is preferably connected to the backhauling interface 106 of the BBU 101. In particular, according to the embodiment shown in FIG. 1, the measurement probe 23 is connected to the backhauling interface 106 via two interfaces 24, 24' connected to the backhauling link 107. More particularly, if the backhauling link 107 comprises a pair of optical fibers (one per each traffic direction), the measurement probe 23 is connected to each optical fiber of the backhauling link 107 via a respective interface 24, 24', e.g. a respective Ethernet interface in case of LTE.

The performance measurement apparatus 2 is preferably co-located with the BBU 101. In particular, the performance measurement apparatus 2 is preferably positioned in the same protected indoor location as the BBU 101 (e.g. a cabinet or the basement of the building). This allows preventing unauthorized access to the performance measurement apparatus 2. This also allows minimizing the length of the wired connections 25, 26, as it will be discussed in detail herein after.

Figure 2:
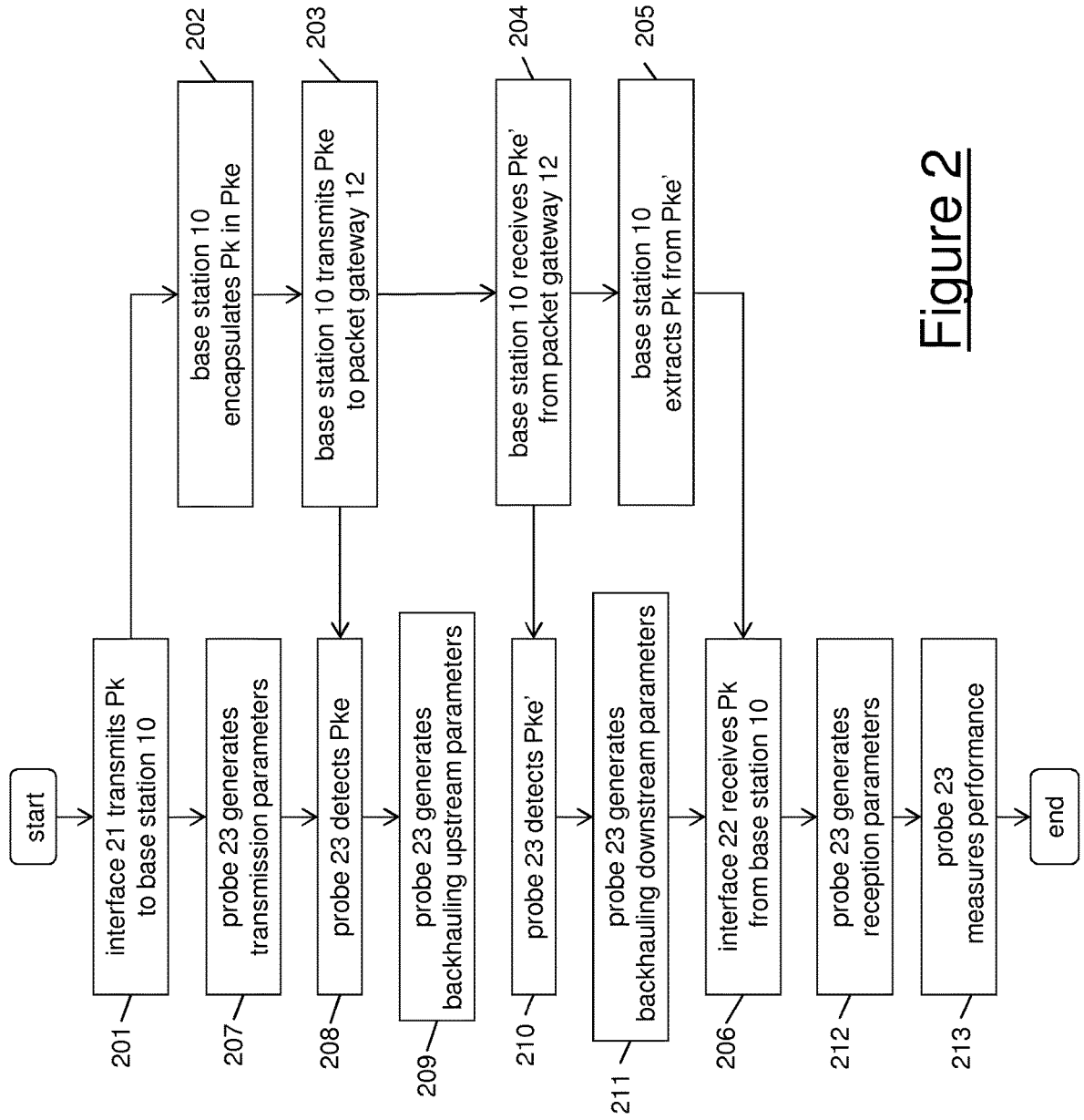
FIG. 2 is a flow chart showing the operation of the mobile communication system and performance measurement apparatus of FIG. 1.

The operation of the mobile communication system 1 and the performance measurement apparatus 2 will be now described in detail, with reference to the flow chart of FIG. 2. In FIG. 2, the steps carried out by the mobile communication system 1 are depicted on the rightmost side of the flow chart, while the steps carried out by the performance measurement apparatus 2 are depicted on the leftmost side of the flow chart.

According to the present invention, the first measurement mobile interface 21 preferably generates a flow of packets Pk addressed to the second measurement interface 22. Hence, each packet Pk preferably comprises the address of the first measurement mobile interface 21 as its source address, and the address of the second measurement mobile interface 22 as its destination address. In case the mobile communication system 1 is an LTE system, the packets Pk are IP packets, and the addresses of the measurement mobile interfaces 21, 22 are IP addresses. The addresses of the first measurement mobile interface 21 and second measurement mobile interface 22 are preferably dynamically assigned thereto by the packet gateway 12.

If the performance measurement carried out by the apparatus 2 is based on a packet marking, such as that described e.g. in the above mentioned WO 2010/072251 and WO 2011/079857, the first measurement mobile interface 21 also preferably marks each generated packet Pk. In particular, the first measurement mobile interface 21 marks the packets Pk by setting a field of the packet header to one of two alternative marking values (e.g. "0" and "1", in case the marking field is a single bit) and by periodically changing the marking value so as to divide the flow of packets Pk in alternating blocks.

The first measurement mobile interface 21 then preferably transmits the packets Pk addressed to the second measurement mobile interface 22 to the base station 10 (step 201). According to the preferred embodiment shown in FIG. 1, at step 201 the packets Pk are injected in the form of a radio frequency signal on the wired connection 105 via the wired connection 25, and accordingly directly reach the RRU 102 bypassing the antenna system 103.

Then, the base station 10 preferably encapsulates the received packets Pk in a flow of encapsulated packets Pke addressed to the packet gateway 12 (step 202). In particular, at step 202 the RRU 102 firstly performs a conversion of the radio frequency signal carrying the packets Pk from radio frequency domain to baseband domain. The RRU 102 then forwards the baseband signal carrying the packets Pk to the BBU 101, which performs its baseband processing (e.g. extracting the packets Pk). Then, at step 202 the BBU 101 preferably encapsulates the received packets Pk in a flow of encapsulated packets Pke addressed to the packet gateway 12. Each one of the encapsulated packets Pke preferably comprises the address of the base station 10 as its source address, and the address of the packet gateway 12 as its destination address. In case the mobile communication system 1 is an LTE system, also the encapsulated packets Pke are IP packets, and the addresses of the base station 10 and the packet gateway 12 are IP addresses. Optionally, the BBU 101 may also encrypt the packets Pk before encapsulating them.

The base station 10 then preferably forwards the encapsulated packets Pke to the packet gateway 12 (step 203). In particular, at step 203 the BBU 101 preferably transmits the encapsulated packets Pke via its backhauling interface 106 and backhauling link 107 to the backhauling network 11. The backhauling network 11 preferably routes the encapsulated packet Pke to the packet gateway 12.

The packet gateway 12 preferably de-encapsulates the packets Pke, thereby recovering the original packets Pk. Then, based on the destination address of the packets Pk (which, as discussed above, is the address of the second measurement mobile interface 22), the packet gateway 12 determines that the packets Pk shall be sent back to the base station 10. It shall be noticed that—in a known way—at step 202 the base station 10 does not perform any routing operation of the packets Pk based on their destination address. The base station 10 indeed ignores the destination address of the packets Pk and automatically encapsulates and sends them to the packet gateway 12, independently of their original destination address. Hence, even though both source and destination of packets Pk are located within the coverage area of the same base station 10, nonetheless they are forwarded up to the packet gateway 12, which possesses the routing functionalities needed to properly route the packets Pk based on their destination address. The packet gateway 12 accordingly encapsulates again the packets Pk in a flow of further encapsulated packets Pke' addressed to the base station 10. In particular, each one of the further encapsulated packets Pke' preferably comprises the address of the packet gateway 12 as its source address, and the address of the base station 10 as its destination address. In case the mobile communication system 1 is an LTE system, also the further encapsulated packets Pke' are IP packets.

The packet gateway 12 then preferably transmits the further encapsulated packets Pke' to the base station 10 via the backhauling network 11 (step 204). In particular, at step 204 the further encapsulated packets Pke' are received at the BBU 101 via its backhauling link 107 and backhauling interface 106.

Then, the base station 10 (in particular, the BBU 101) preferably extracts the packets Pk from the further encapsulated packets Pke' (step 205), thereby recovering the original packets Pk whose destination address is the address of the second measurement mobile interface 22. At step 205, the BBU 101 then preferably sends the extracted packets Pk to the RRU 102 via the wired connection 105 in the form of a baseband signal. The RRU 102 preferably performs a conversion of the baseband signal carrying the extracted packets Pk from baseband domain to radio frequency domain.

The base station 10 then preferably forwards the extracted packets Pk to the second measurement mobile interface 22 (step 206). In particular, the RRU 102 preferably forwards the packets Pk in the form of a radio frequency signal to the second measurement interface 22. In particular, according to the preferred variant shown in FIG. 1, at step 206 the radio frequency signal carrying the packets Pk is transmitted via the wired connection 105 and the wired connection 26, and accordingly directly reach the second measurement interface 22 bypassing the antenna system 103.

Since the packets Pk basically travel back and forth between the performance measurement apparatus 2 and the packet gateway 12, the path they follow through the mobile communication system 1 from step 201 to step 206 basically comprises two radio access sections (from the first measurement mobile interface 21 to the base station 10 and from the base station 10 to the second measurement mobile interface 22) and two backhauling sections (from the base station 10 to the packet gateway 12 and from the packet gateway 12 to the base station 10).

As the first measurement mobile interface 21 is transmitting the packets Pk to the base station 10 (step 201), the apparatus 2 (in particular, its measurement probe 23) preferably generates transmission parameters relating to the packets Pk as transmitted (step 207). For instance, the transmission parameters generated at step 207 may be the transmission timestamps of the packets Pk, namely the times at which the packets Pk are transmitted by the first measurement mobile interface 21.

Furthermore, as the base station 10 is transmitting the encapsulated packets Pke—which comprise the packets Pk, possibly encrypted—to the packet gateway 12 (step 203), the measurement probe 23 preferably detects the encapsulated packets Pke (step 208). If the packets Pk are encrypted before their encapsulation, the probe 23 shall decrypt them in order to be able to detect them. This requires that the apparatus 2 possesses the encryption key used by the BBU 101 (the encryption key is typically shared amongst base station and packet gateway only).

In order to allow detection of the encapsulated packets Pke by the measurement probe 23, all the upstream traffic transmitted by the backhauling interface 106 is preferably split (e.g. via an optical splitter) so as to create a copy thereof, which is then received by the probe 23 via the interface 24. The upstream traffic is then filtered in a known way so as to filter out the encapsulated packets Pke based on the value of a predefined field uniquely identifying the packets Pk which they carry (e.g. the source or destination address of the packets Pk or the marking field, if any). In order to implement such filtering, the copy of the upstream traffic is preferably subjected to a deep packet inspection with offset, which allows reading the values of a predefined field in the header of the packets encapsulated therein.

The apparatus 2 (in particular, its measurement probe 23) then preferably generates backhauling upstream parameters relating to the encapsulated packets Pke (and to the packets Pk encapsulated therein) as transmitted (step 209). For instance, the backhauling upstream parameters may be the transmission timestamps of the encapsulated packets Pke, namely the times at which the encapsulated packets Pke are transmitted by the backhauling interface 106 in the upstream direction.

Moreover, as the base station 10 is receiving the further encapsulated packets Pke'—which comprise the packets Pk, possibly encrypted—from the packet gateway 12 (step 204), the measurement probe 23 preferably detects the further encapsulated packets Pke' (step 210).

In order to allow detection of the encapsulated packets Pke' by the measurement probe 23, all the downstream traffic received at the backhauling interface 106 is preferably split (e.g. via a further optical splitter) so as to create a copy thereof, which is then received by the probe 23 via the interface 24'. The downstream traffic is then filtered in a known way so as to filter out the encapsulated packets Pke' based on the value of a predefined field uniquely identifying the packets Pk which they carry (e.g. the source or destination address of the packets Pk or the marking field, if any). In order to implement such filtering, the copy of the downstream traffic is preferably subjected to a deep packet inspection with offset, which allows reading the values of a predefined field in the header of the packets encapsulated therein.

The apparatus 2 (in particular, its measurement probe 23) then preferably generates backhauling downstream parameters relating to the further encapsulated packets Pke' (and of the packets Pk encapsulated therein) as received (step 211). For instance, the backhauling downstream parameters may be the reception timestamps of the further encapsulated packets Pke', namely the times at which the further encapsulated packets Pke' are received at the backhauling interface 106.

Finally, as the second measurement interface 22 is receiving the packets Pk from the base station 10 (step 205), the apparatus 2 (in particular, its measurement probe 23) preferably generates reception parameters relating to the packets Pk as received (step 212). For instance, the reception parameters generated at step 212 may be the reception timestamps of the packets Pk, namely the times at which the packets Pk are received at the second measurement interface 22.

The measurement probe 23 of the apparatus 2 then preferably uses the parameters generated at steps 207, 209, 211 and 212 for measuring the performance of the mobile communication system 1 as the performance of the mobile connection between the two measurement mobile interfaces 21, 22 (step 213). In particular, at step 213 the measurement probe 23 preferably performs at least one of the following performance measurements:

(i) end-to-end performance measurements between the first measurement mobile interface 21 and second measurement mobile interface 22. Such measurements are preferably based on the transmission parameters relating to the packets Pki as transmitted by the first measurement mobile interface 21 (generated at step 207) and the reception parameters relating to the packets Pki as received at the second measurement mobile interface 22 (generated at step 212). It shall be noticed that this type of measurement basically is a round-trip measurement between the performance measurement apparatus 2 and the packet gateway 12.

(ii) two-way performance measurements from the first measurement mobile interface 21 to the backhauling interface 106 of the base station 10 (upstream direction) and from the backhauling interface 106 of the base station 10 to the second measurement mobile interface 22 (downstream direction). Such measurements are preferably based on, respectively:

the transmission parameters relating to the packets Pki as transmitted by the first measurement mobile interface 21 (generated at step 207) and the backhauling upstream parameters (generated at step 209) for the upstream direction, and the backhauling downstream parameters (generated at step 211) and the reception parameters relating to the packets Pki as received at the second measurement mobile interface 22 (generated at step 212) for the downstream direction.

This performance measurement is advantageously circumscribed to the radio access network only (backhauling network 11 and network 13 are excluded from measurement), and accordingly allows detecting possible problems arising in the radio access network (specifically, in the base station 10). Furthermore, they also advantageously allow detecting possible asymmetries in the behavior of the radio access network (specifically, of the base station 10) in the two traffic directions.

(iii) round-trip performance measurements between the base station 10 (in particular, its backhauling interface 106) and the packet gateway 12. Such measurements are preferably based on the backhauling upstream parameters (generated at step 209) and the backhauling downstream parameters (generated at step 211). This performance measurement is advantageously circumscribed to the backhauling network 11 only (radio access network and network 13 are excluded from measurement), and accordingly allows detecting possible problems arising in the backhauling network 11.

For instance, for a certain packet Pk generated by the first measurement mobile interface 21 and addressed to the second measurement mobile interface 22, the processing unit 20 may generate:

a transmission timestamp T(tx) indicating the time at which the packet Pk is transmitted from the first measurement mobile interface 21 (step 207);

a backhauling upstream timestamp T(up) indicating the time at which the encapsulated packet Pke carrying the packet Pk is transmitted from the backhauling interface 106 to the packet gateway 12 (step 209);

a backhauling downstream timestamp T(down) indicating the time at which the further encapsulated packet Pke' carrying the packet Pk is received at the backhauling interface 106 from the packet gateway 12 (step 211); and a reception timestamp T(rx) indicating the time at which the packet Pk is received at the second measurement mobile interface 22 (step 212).

Based on such parameters, the processing unit 20 at step 213 may calculate:

(i) an end-to-end delay of the packet Pk between the first measurement mobile interface 21 and second measurement mobile interface 22 as T(rx)-T(tx);

(ii) an upstream delay of the packet Pk from the first measurement mobile interface 21 to the backhauling interface 106 as T(up)-T(tx) and a downstream delay of the packet Pk from the backhauling interface 106 to the second measurement mobile interface 22 to the as T(rx)-T(down); and (iii) a round-trip delay of the packet Pk between the base station 10 (in particular, its backhauling interface 106) and the packet gateway 12 as T(down)-T(up).

Hence, besides providing end-to-end measurements between the two mobile interfaces 21, 22, the performance monitoring apparatus 2 advantageously provides separate two-way measurements relating to the radio access network and round-trip measurements relating to the backhauling network.

This segmentation of the performance measurement is advantageously achieved without requiring any marking of the packets to be measured. Indeed, as mentioned above, the measurement probe 23 is advantageously capable of recognizing the packets Pk to be measured even though they do not comprise any marking, since it is part of the same apparatus 2 which generated the packets Pk and accordingly knows how to identify them (e.g. based on their source or destination address, which it retrieves from the interfaces 21, 22). Hence, the apparatus 2 may be configured to execute performance measurement that do not provide for any packet marking, e.g. those based on the known Ping mechanism. Throughput measurements and packet loss measurements according to any known technique may be carried out by the apparatus 2 as well.

Moreover, no synchronization of different apparatuses is required, since all the parameters allowing performance measurements (e.g. transmission timestamps, reception timestamps, etc.) are generated by the apparatus 2 solely.

Furthermore, since the apparatus 2 is autonomously capable of carrying out the whole measurement session without involving any centralized entity, the measurement performance is independent of the number of measurement sessions simultaneously opened in the mobile communication system.

Using a single apparatus 2 has further advantages, e.g. reducing the amount of hardware needed for performance monitoring purposes and then, ultimately, reducing the costs for performance monitoring.

Moreover, connecting the measurement mobile interfaces 21, 22 directly to the wired connection 105 between the RRU 102 and the antenna system 103 (and hence bypassing the antenna system 103 both in the upstream direction and in the downstream direction) as shown in FIG. 1 has further advantages, in particular over the above cited variant wherein the interfaces 21, 22 communicate via radio with the antenna system 103.

First of all, any uncertainty on the performance measurement results due to inherent variability of the radio connection between the antenna system 103 and the antennas of the interfaces 21, 22 are avoided.

Further, the wired connections 25, 26 which connect the interfaces 21, 22 to the wired connection 105 may be advantageously much shorter than the cable length needed to connect the interfaces 21, 22 with the respective antennas. The antennas of the interfaces 21, 22 shall be indeed located in a position "visible" by the antenna system 103. Since the interfaces 21, 22 (together with the whole apparatus 2) are typically located in a protected indoor location (e.g. the basement of a building), such cable length might be of tens of meters. Such long cable length would induce high power losses, which could impair the radio communication between interfaces 21, 22 and antenna system 103. The wired connections 25, 26 may be instead very short (a few meters), especially if the point of the wired connection 105 at which they are joined is close to the RRU 102. This allows calibrating the signal power in order to allow proper functioning of the interfaces 21, 22, as it will be discussed in detail herein after.

Furthermore, locating the antennas of the interfaces 21, 22 in a suitable position may entail practical installation issues. The position of such antennas should be "visible" by the antenna system 103 and, at the same time, shall be protected so as to minimize the risk of non authorized accesses. Finding a position fulfilling both requirements at the same time may be not easy. Installing the connections 25, 26 is instead much easier and may be done using few simple radio frequency components, as it will be described in detail herein after.

Figure 3:
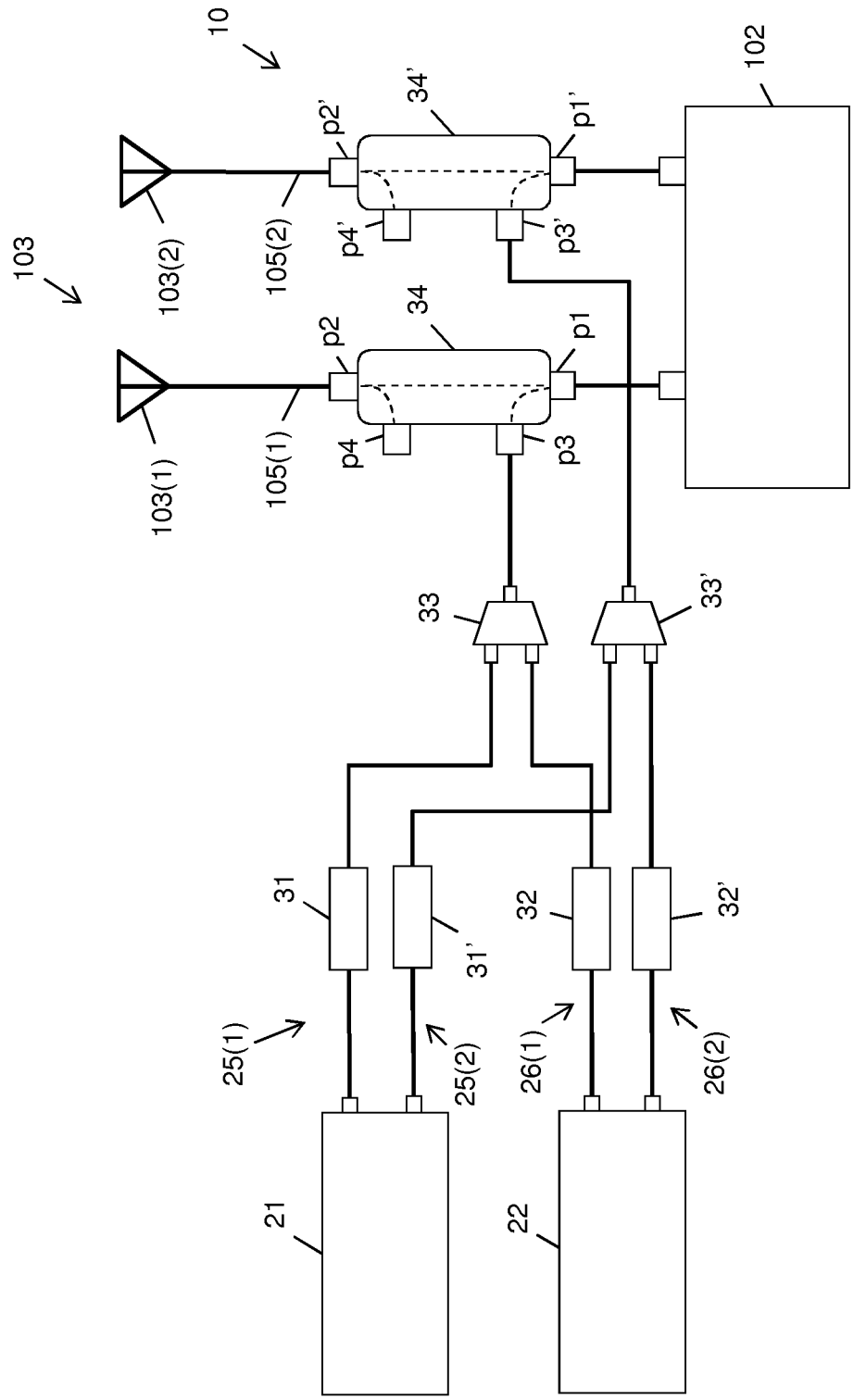
FIG. 3 shows in further detail a portion of the apparatus of FIG. 1, according to a first variant.

With reference to FIG. 3, the connections 25, 26 between the measurement mobile interfaces 21, 22 and the wired connection 105 will be described in further detail.

As mentioned above, by way of non limiting example it has been assumed that the base station 10 is configured to provide coverage to a single cell, operates on a single radio carrier and is provided with MIMO 2×2 capabilities (which is typical in eNodeBs for LTE radio communication systems). The base station 10 accordingly comprises a single RRU 102 and its antenna system 103 comprises two antennas, namely a main antenna 103(1) and a secondary antenna 103(2), depicted in FIG. 3.

The wired connection 105 connecting the RRU 102 to the antenna system 103 accordingly comprises two separate wired connections: a main connection 105(1) connecting the RRU 102 with the main antenna 103(1) and a secondary connection 105(2) connecting the RRU 102 with the secondary antenna 103(2). Each connection 105(1), 105(2) preferably comprises a respective length of coaxial cable. The antennas 103(1) and 103(2) may be implemented as a single physical antenna, e.g. if the MIMO capability exploits different polarization states of the radio signals. In this case, radio signals with different polarization states are exchanged with the RRU 102 via separate connections 105(1), 105(2).

Preferably, the wired connection 25 shown in FIG. 1, which connects the first measurement mobile interface 21 with the antenna system 103, comprises a main connection 25(1), which connects the first measurement mobile interface 21 with the main connection 105(1) between RRU 102 and main antenna 103(1), and a secondary connection 25(2), which connects the first measurement mobile interface 21 with the secondary connection 105(2) between RRU 102 and secondary antenna 103(2). Similarly, the wired connection 26 shown in FIG. 1, which connects the second measurement mobile interface 22 with the antenna system 103, comprises a main connection 26(1), which connects the second measurement mobile interface 22 with the main connection 105(1) between RRU 102 and main antenna 103(1), and a secondary connection 26(2), which connects the second measurement mobile interface 22 with the secondary connection 105(2) between RRU 102 and secondary antenna 103(2).

Herein after, the main connections 25(1), 26(1) connecting the first and second measurement mobile interfaces 21, 22 with the main connection 105(1) between the RRU 102 and the main antenna 103(1) will be described in detail.

As depicted in FIG. 3, each connection 25(1), 26(1) comprises a number of radio frequency components, which are joined by radio frequency cables (preferably, coaxial cables) and radio frequency connectors.

Each wired connection 25(1), 26(1) in particular is preferably provided with a respective variable attenuator 31, 32, which allows regulating the power exiting or entering the interface 21, 22 so as to guarantee that the power received is high enough to ensure good reception performance, but low enough to prevent possible damages to the receiver. To this purpose, each variable attenuator 31, 32 is preferably capable of introducing an attenuation in the range 50-60 dB. Instead of a single attenuator, multiple cascaded variable attenuators with lower attenuation ranges may be provided on each wired connection 25(1), 26(1).

Preferably, the wired connections 25(1), 26(1) are reciprocally joined by means of a splitter/combiner 33, before they are joined to the main connection 105(1). The splitter/combiner 33 introduces a power loss of 3 dB about on each connection 25, 26. Preferably, the splitter/combiner 33 has an isolation equal to or higher than 20 dB, more preferably equal to or higher than 25 dB. This guarantees that only a minimum portion of the power coming from the first interface 21 is sent to the second interface 22, so that unwanted intra-system interference is minimized).

The common port of the splitter/combiner 33 is then connected to the main connection 105(1) exiting the RRU 102 via a directional coupler 34 inserted on the main connection 105(1). As known, a directional coupler is a passive radio frequency device having four ports (indicated as p1, p2, p3 and p4 in FIG. 3). As known, within the device a main line joins two ports p1 and p2, also termed "main ports". Ports p3 and p4 are instead called "coupled ports". Further, within the device, each coupled port p3, p4 is connected to only one of the main ports p1, p2. The directional coupler 34 is preferably inserted on the main connection 105(1) so that the main connection 105(1) enters and exits the directional coupler 34 through the main ports p1 and p2, with the main port p1 facing the RRU 102 and the main port p2 facing the main antenna 103(1). The wired connections 25(1), 26(1) are preferably connected (via the splitter/combiner 33) to the coupled port p3 connected to the main port p1 facing the RRU 102, while the other coupled port p4 of the directional coupler 34 is left unused.

In order not to degrade the coverage of the antenna system 103, the directional coupler 34 preferably has an insertion loss (namely, a power loss between the main ports p1 and p2) lower than 1 dB, for instance equal to about 0.5 dB. Moreover, the directional coupler 34 preferably has a coupling loss (namely, a power loss between each main port and the respective coupled port) greater than 30 dB, more preferably equal to or greater than 40 dB.

In the upstream direction, as the first measurement interface 21 transmits a radio signal carrying the packets Pk via the wired connection 25(1), such radio signal is attenuated by the variable attenuator 31, then passes through the splitter/coupler 33 thereby reaching the coupled port p3 of the directional coupler 34. The coupled port p3 couples the radio signal to the main port p1, which forwards it to the RRU 102.

Conversely, in the downstream direction, as the RRU 102 transmits a radio signal carrying the packets Pk addressed to the second interface 22 via the wired connection 105(1), such radio signal enters the directional coupler 34 via the main port p1, which couples it to the coupled port p3. Through the coupled port p3, the radio signal reaches the splitter/coupler 33, which forwards it on the wired connection 26(1). On the wired connection 26, the radio signal is attenuated by the variable attenuator 32, and is then received by the second measurement mobile interface 22.

The structure and operation of the secondary connections 25(2), 26(2) connecting the first and second measurement mobile interfaces 21, 22 with the secondary connection 105(2) between RRU 102 and secondary antenna 103(2) is substantially the same as described above. Hence, a detailed description will not be repeated. In FIG. 3, the components of such secondary connections 25(2), 26(2) are indicated by the same reference numerals as the corresponding components of the main connections 25(1), 26(1), followed by primes' signs.

Herein after, by way of non limiting example, an exemplary power budget of the connection between the interfaces 21, 22 and the RRU 102 via the main connections 25(1), 26(1) is set forth. It is assumed:

transmission power RRU in downstream direction: $P^{TX}_{102}=40$ dBm;
transmission power interface 21: $P^{TX}_{21}=20$ dBm;
coupling loss directional coupler 34: $CL_{34}=40$ dB;
insertion loss directional coupler 34: $IL_{34}=0.5$ dB;
attenuation attenuators 31, 32: ATT=60 dB;
loss splitter/combiner 33: $L_{33}=3$ dB;
loss coaxial cables and connectors: $L_{cable}=3$ dB.

Under the above assumptions, the power received by the second measurement mobile interface 22 in the downstream direction and the power received by the RRU 102 in the upstream direction are respectively:

$P^{RX}_{22}=P^{TX}_{102}-CL_{34}-ATT-L_{33}-L_{cable}=-66$ dBm; and
$P^{RX}_{102}=P^{TX}_{21}-CL_{34}-ATT-L_{33}-L_{cable}=-86$ dBm.

It may be appreciated that such values (in particular the value $P^{RX}_{22}=-66$ dBm) is low enough to prevent damages to the second measurement mobile interface 22. In case such interface is implemented as a USB dongle, the received power shall indeed not exceed −60 dBm.

It shall be noticed that the above power levels are referred to the antenna connectors both from eNodeB and mobile equipment's side. The same exemplificative power budget applies also to the connection between the interfaces 21, 22 and the RRU 102 via the secondary connections 25(2), 26(2).

According to other variants not shown in the drawings, the base station 10 itself (e.g. the RRU 102) is provided with monitoring ports (namely, ports through which the base station 10 outputs a copy of the emitted/received signals), to which the measurement mobile interfaces 21, 22 may be directly connected via the wired connections 25, 26, thus omitting the directional coupler 34.

It is noted that in the embodiment of FIG. 3, each variable attenuator introduces a same attenuation in both directions. This may be not optimal is some cases. The first measurement mobile interface 21 indeed, besides transmitting the packets Pk in the upstream direction, also typically receives downstream traffic (e.g. signaling traffic such as acknowledgement messages for the transmitted packets). Similarly, the second measurement mobile interface 22, besides receiving the packets Pk in the downstream direction, also typically transmits upstream traffic (e.g. signaling traffic such as the above mentioned acknowledgement messages for the received packets). Hence, each connection 25(1), 25(2), 26(1), 26(2) typically supports traffic transmission in both upstream and downstream directions.

Figure 4:
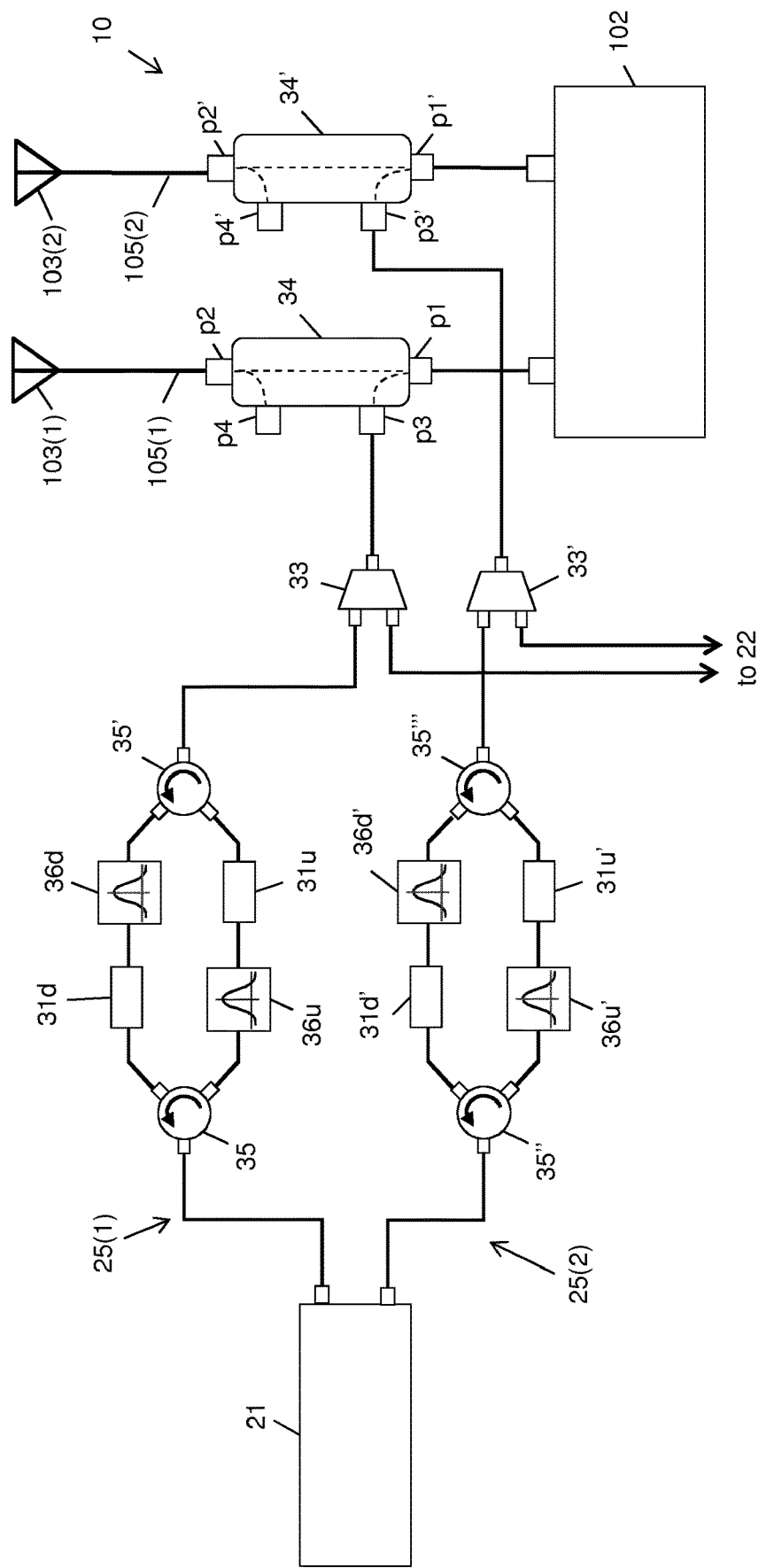
FIG. 4 shows in further detail a portion of the apparatus of FIG. 1, according to a second variant.

FIG. 4 shows a further embodiment, where two separate variable attenuators are provided on each wired connection 25(1), 25(2), one for the upstream direction and one for the downstream direction (in FIG. 4, for not overloading the drawing, the second measurement mobile interface 22 with the respective wired connections 26(1), 26(2) has not been depicted. The following considerations on connections 25(1), 25(2) apply also to connections 26(1), 26(2)).

As shown in FIG. 4, referring e.g. to the wired connection 25(1) connecting the first measurement interface 21 with the main connection 105(1) between RRU 102 and main antenna 103(1), this connection preferably comprises two circulators 35, 35' which split the connection 25(1) in two branches, namely an upstream branch and a downstream branch. The upstream branch preferably comprises an upstream variable attenuator 31u and an upstream filter 36u centered in the upstream bandwidth, while the downstream branch preferably comprises a downstream variable attenuator 31d and a downstream filter 36d centered in the downstream bandwidth. Similarly, the wired connection 25(2) connecting the first measurement interface 21 with the secondary connection 105(2) between RRU 102 and secondary antenna 103(2) comprises two circulators 35", 35''' which split the connection 25(2) in two branches, namely an upstream branch and a downstream branch. The upstream branch preferably comprises an upstream variable attenuator 31u' and an upstream filter 36u' centered in the upstream bandwidth, while the downstream branch preferably comprises a downstream variable attenuator 31d' and a downstream filter 36d' centered in the downstream bandwidth.

This variant therefore allows optimizing the power budget separately for the upstream direction and the downstream direction, so as to equalize their performance.

Figure 5:
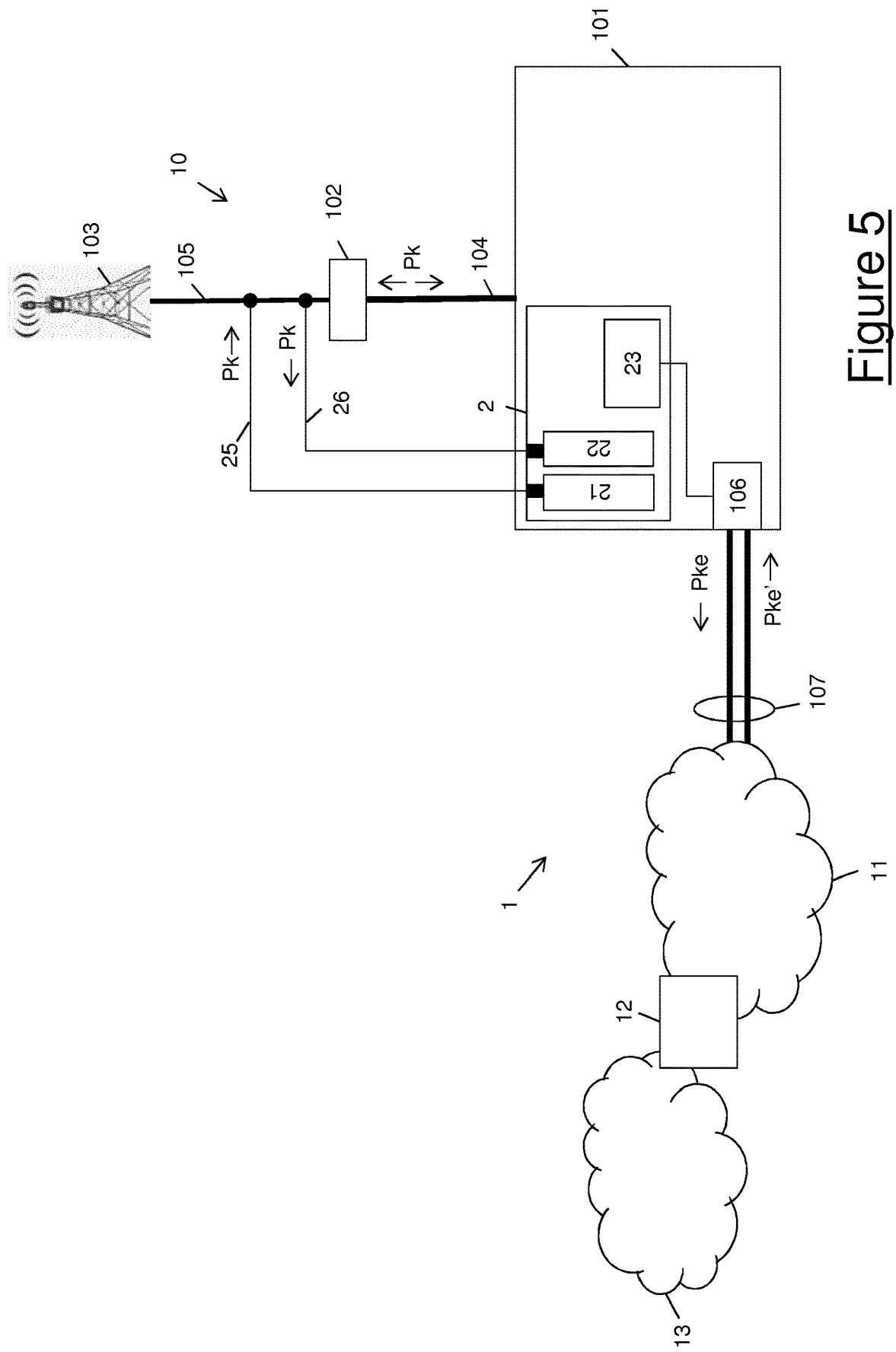
FIG. 5 schematically shows a mobile communication system and a performance measurement apparatus according to a second embodiment of the present invention.

FIG. 5 shows a performance measurement apparatus 2 according to a second embodiment of the present invention.

According to this second embodiment, the performance measurement apparatus 2 is embedded within the base station 10. In particular, the performance measurement apparatus 2 is preferably embedded within the BBU 101 of the base station 10. In such case, the measurement probe 23 is directly connected to the backhauling interface 106 and may therefore detect the packets to be measured. Hence, the interfaces 24, 24' are not needed in the second embodiment.

In addition to the above advantages of the first embodiment shown in FIG. 1 (and variants shown in FIGS. 2 to 4), this second embodiment also exhibits the advantage of integrating the performance measurement functionalities within the base station itself, thereby allowing to reduce the amount of hardware required and, ultimately, the costs for performance monitoring. Moreover, detection of the packets Pk by the probe 23 is advantageously eased in case the packets Pk are encrypted before their encapsulation. Since the apparatus 2 is embedded within the base station 10, it inherently possesses the encryption key for decrypting them and hence detect them. Alternatively, the probe 23 may be configured to intercept the packets Pk before their encryption and encapsulation.

Figure 6:
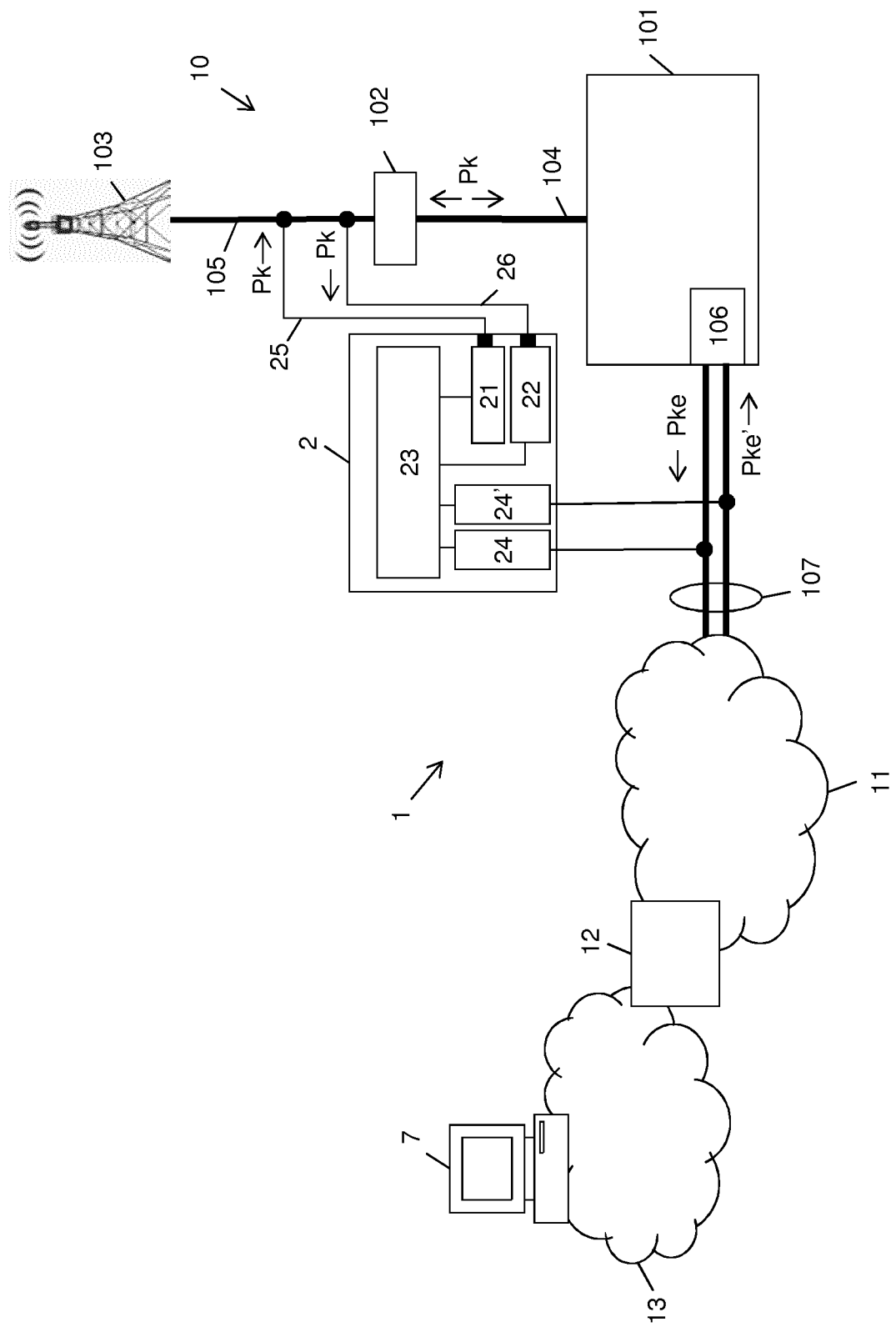
FIG. 6 schematically shows an alternative application of the apparatus of FIG. 1.

FIG. 6 shows an alternative application of the performance measurement apparatus 2 shown in FIG. 1. While, as mentioned above, the apparatus 2 is capable of autonomously performing a certain number of performance measurements without requiring any interaction with a central server, nonetheless it might be used in combination with a remote server for providing other types of performance measurements.

As shown in FIG. 6, for example, a remote server 7 may be implemented within the network 13. Assuming that the remote server 7 exchanges with anyone of the measurement mobile interfaces 21, 22 further flows of packets (other than the packets Pk exchanged between the interfaces 21, 22), the combination of the remote server 7 and the apparatus 2 may advantageously provide two-way end-to-end measurements of the connection between any one of the measurement mobile interfaces 21, 22 of the apparatus 2 and the remote server 7. Hence, the remote server 7 allows extending the performance measurements to the network 13, provided the packets Pk may be recognized by the server 7.

In case the packets are marked, other probes may be positioned along the transmission path of the packets between the base station 10 and the remote server 7. Such further probes allow further segmenting the transmission path of the packets, and hence to provide separate performance measurements for each segment of the path.

According to other variants not shown in the drawings, the first measurement mobile interface 21 and the second measurement mobile interface 22 are integrated in a same mobile interface having a unique address (an IP address, in case of LTE). According to such variants, the packets Pk generated by the unique mobile interface shall have source address equal to the destination address. In order to practically implements such variants, the base station 10 and the packet gateway 12 are preferably configured not to discard the packets Pk (since their source address is equal to their destination address, some network apparatuses may consider such packets as invalid and discard them). In such variants, embedding the apparatus 2 with the unique measurement mobile interface within the base station 10 itself would advantageously ease the operation of configuring the base station 10 not to discard the packets Pk.

Finally, as mentioned above, if the packets Pk transmitted by the first measurement mobile interface 21 are encrypted before they are encapsulated into packets Pke or Pke' by the BBU 101 or packet gateway 12, the measurement probe 23 shall posses the decryption keys, in order to decrypt the packets Pk and identify them amongst all the traffic exiting or entering the base station 10 via the backhauling interface 106. As mentioned above, implementing the apparatus 2 within the base station 10 would ease this process, because in such case the apparatus 2 (and therefore the measurement probe 23) would inherently posses the decryption keys, or alternatively may filter the packets Pk before they are encrypted (upstream direction) or after they are decrypted (downstream direction) by the BBU 101.

According to an alternative embodiment, the BBU 101 preferably maps or copies the field of the packet header allowing identification of the packets Pk by the measurement probe 23 (e.g. the marking field, if the packets Pk are marked) into a predefined field of the header of the packets Pke which it transmits to the packet gateway 12 via its backhauling interface 106. Similarly, according to this embodiment the packet gateway 12 preferably maps or copies the field of the packet header allowing identification of the packets Pk by the measurement probe 23 (e.g. the marking field, if the packets Pk are marked) into a predefined field of the header of the packets Pke' which it transmits to the backhauling interface 106 of the BBU 101. This advantageously allows the measurement probe 23 recognizing the packets Pke and Pke' carrying the packets Pk based on the value of the predefined field of their header, without performing any deep packet inspection and decryption of the packets Pk.

To this purpose, according to a particularly preferred variant, the reserved bit of the known 3-bit "Flags field" in the IP header of packets Pk is used as a marking field, and the reserved bit of the corresponding 3-bit "Flags field" in the IP header of packets Pke and Pke' is used for copying the value of the marking field of packets Pk.

This in principle does not allow providing an alternating marking of the packets Pk (the value "1" in the "unused bit" field allows distinguishing the packets Pk from the other packets, that are identified by the value "0". Hence, the value "0" is not available as the second, alternative marking value allowing to implement an alternating marking of the packets Pk).

According to a still preferred variant, in order to divide the marked packets Pk into alternating blocks, a time gap is provided between transmission of consecutive blocks of packets Pk. The time gap is preferably selected long enough to prevent any reception sequence error between packets Pk of different blocks. For instance, a block period of 5 minutes may be divided into 4 minutes for the transmission of a block of packets Pk and a time gap of 1 minute.

The invention claimed is:

1. An apparatus for measuring performance of a mobile communication system comprising a base station, a packet gateway and a backhauling network connecting said base station and said packet gateway, said apparatus comprising:
   a first measurement mobile interface and a second measurement mobile interface, said first measurement mobile interface being configured to transmit packets addressed to said second measurement mobile interface via said base station so that said packets are transmitted, by encapsulating said packets, from said base station to said packet gateway and back from said packet gateway to said base station, and said second measurement mobile interface being configured to receive said packets from said base station after the encapsulated packets have been sent to said packet gateway and back; and
   a measurement probe suitable for being connected to a backhauling interface of said base station and for detecting a duplicate copy of the encapsulated packets, wherein:
      the encapsulated packets are generated based on encapsulating, by said base station or said packet gateway, said packets;
      the duplicate copy of the encapsulated packets is generated based on duplicating the encapsulated packets as transmitted from said base station to said packet gateway or as received at said base station from said packet gateway; and
      said measurement probe is further configured to generate at least one first performance parameter relating to said packets as transmitted from said first measurement mobile interface or said packets as received at said second measurement mobile interface, generate at least one second performance parameter relating to the duplicate copy of the encapsulated packets as detected by said measurement probe, and use said at least one first performance parameter or said at least one second performance parameter for measuring a performance of said mobile communication system.

2. The apparatus according to claim 1, wherein said measurement probe is configured to detect the duplicate copy of the encapsulated packets by receiving a copy of traffic transmitted from said base station to said packet gateway or received at said base station from said packet gateway and filtering said copy of the traffic based on a value of a field of said packets which uniquely identifies said packets.

3. The apparatus according to claim 2, wherein said field whose value uniquely identifies said packets is a source address field or a destination address field of said packets.

4. The apparatus according to claim 2, wherein said field whose value uniquely identifies said packets is a marking field of said packets.

5. The apparatus according to claim 2, wherein said measurement probe is configured to decrypt said packets before filtering them.

6. The apparatus according to claim 2, wherein said measurement probe is configured to filter said copy of the traffic before it is encrypted by said base station and transmitted to said packet gateway or after it is received at said base station from said packet gateway and decrypted by said base station.

7. The apparatus according to claim 1, wherein said measurement probe is configured to perform one or more of:
end-to-end performance measurements between said first measurement mobile interface and said second measurement mobile interface based on said at least one first performance parameter;
two-way performance measurements from said first measurement mobile interface to said backhauling interface of said base station and from said backhauling interface of said base station to said second measurement mobile interface based on said at least one first performance parameter and said at least one second performance parameter; or
round-trip performance measurements between said backhauling interface of said base station and said packet gateway based on said at least one second performance parameter.

8. The apparatus according to claim 1, wherein said apparatus also comprises:
a first wired connection suitable for connecting said first measurement mobile interface with a wired connection between an antenna system of said base station and a radio remote unit of said base station, said first measurement mobile interface being configured to transmit said packets to said radio remote unit of said base station via said first wired connection, so that said packets bypass said antenna system; and
a second wired connection suitable for connecting said second measurement mobile interface with said wired connection between said antenna system of said base station and said radio remote unit of said base station, said second measurement mobile interface being configured to receive said packets from said radio remote unit of said base station via said second wired connection, so that said packets bypass said antenna system.

9. The apparatus according to claim 8, wherein:
one or more of said first wired connection or said second wired connection comprises a main connection suitable for connecting said first measurement mobile interface or said second measurement mobile interface to a main antenna of said antenna system and a secondary connection suitable for connecting said first measurement mobile interface or said second measurement mobile interface to a secondary antenna of said antenna system.

10. The apparatus according to claim 8, wherein said apparatus further comprises a directional coupler comprising two main ports and two coupled ports, said directional coupler suitable for being inserted in said wired connection between said antenna system and said radio remote unit so that a first main port of the two main ports is connected to said antenna system and a second main port of the two main ports is connected to said radio remote unit, said first wired connection and said second wired connection being jointly connected to one of said two coupled ports of said directional coupler.

11. The apparatus according to claim 8, wherein one or more of said first wired connection or said second wired connection comprises at least one variable attenuator.

12. The apparatus according to claim 11, wherein one or more of said first wired connection or said second wired connection comprise two circulators splitting said one or more of said first wired connection or said second wired connection into an upstream branch and a downstream branch, each one of said upstream branch and said downstream branch comprising a respective variable attenuator.

13. An assembly comprising a base station for a mobile communication system and an apparatus for measuring a performance of said mobile communication system according to claim 1.

14. The assembly according to claim 13, wherein said apparatus is embedded within said base station.

15. The apparatus according to claim 1, wherein the encapsulating, by said base station or said packet gateway, said packets comprises encapsulating said packets with an address of said base station or an address of said packet gateway.

16. The apparatus according to claim 1, wherein said measurement probe is configured to use said at least one first performance parameter and said at least one second performance parameter for measuring the performance of said mobile communication system.

17. A method for measuring performance of a mobile communication system comprising a base station, a packet gateway and a backhauling network connecting said base station and said packet gateway, said method comprising:
providing an apparatus comprising a first measurement mobile interface, a second measurement mobile interface and a measurement probe, and connecting said measurement probe to a backhauling interface of said base station;
by said first measurement mobile interface, transmitting packets addressed to said second measurement mobile interface to said base station, said packets being transmitted, by encapsulating said packets, from said base station to said packet gateway and from said packet gateway to said base station, and said packets being transmitted from said base station to said second measurement mobile interface;
by said measurement probe, detecting a duplicate copy of the encapsulated packets, wherein the encapsulated packets are generated based on encapsulating, by said base station or said packet gateway, said packets, and wherein the duplicate copy of the encapsulated packets is generated based on duplicating the encapsulated packets as transmitted from said base station to said packet gateway or as received at said base station from said packet gateway; and
by said measurement probe, generating at least one first performance parameter relating to said packets as transmitted from said first measurement mobile interface or said packets as received at said second measurement mobile interface, generating at least one second performance parameter relating to the duplicate copy of the encapsulated packets as detected by said measurement probe, and using said at least one first performance parameter or said at least one second performance parameter for measuring a performance of said mobile communication system.

18. The method of claim 17, wherein detecting the duplicate copy of the encapsulated packets comprises receiving a copy of traffic transmitted from said base station to said packet gateway or received at said base station from said packet gateway and filtering said copy of the traffic based on a value of a field of said packets which uniquely identifies said packets.

19. The method of claim 18, wherein said field whose value uniquely identifies said packets is a source address field or a destination address field of said packets.

20. The method of claim 18, wherein said field whose value uniquely identifies said packets is a marking field of said packets.

21. The method of claim 18, further comprising decrypting, by said measurement probe, said packets before the filtering.

22. The method of claim 18, wherein the filtering said copy of the traffic is performed before it is encrypted by said base station and transmitted to said packet gateway or after it is received at said base station from said packet gateway and decrypted by said base station.

* * * * *